United States Patent
Nguyen et al.

(10) Patent No.: US 11,157,199 B1
(45) Date of Patent: Oct. 26, 2021

(54) MULTI-MODE ADDRESS MAPPING MANAGEMENT

(71) Applicant: INTERNATIONAL BUSINESS MACHINES CORPORATION, Armonk, NY (US)

(72) Inventors: Trung N. Nguyen, Vail, AZ (US); Kevin J. Ash, Tucson, AZ (US); Brian Anthony Rinaldi, Tucson, AZ (US); Lokesh Mohan Gupta, Tucson, AZ (US); Kyler A. Anderson, Sahuarita, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 27 days.

(21) Appl. No.: 16/858,539

(22) Filed: Apr. 24, 2020

(51) Int. Cl.
*G06F 3/06* (2006.01)
*G06F 9/455* (2018.01)

(52) U.S. Cl.
CPC .......... *G06F 3/0656* (2013.01); *G06F 3/0619* (2013.01); *G06F 3/0653* (2013.01); *G06F 3/0659* (2013.01); *G06F 3/0679* (2013.01); *G06F 9/45533* (2013.01)

(58) Field of Classification Search
CPC .... G06F 3/0656; G06F 3/0659; G06F 3/0679; G06F 3/0653; G06F 3/0619; G06F 9/45533
See application file for complete search history.

(56) References Cited

U.S. PATENT DOCUMENTS

| | | | |
|---|---|---|---|
| 6,721,847 | B2 | 4/2004 | Hursey |
| 7,277,995 | B2* | 10/2007 | Davies ................. G06F 3/0607 710/240 |
| 7,895,465 | B2 | 2/2011 | Ash et al. |
| 7,975,169 | B2 | 7/2011 | Ash et al. |
| 9,323,586 | B2 | 4/2016 | Moir et al. |
| 10,417,141 | B2 | 9/2019 | Pellegrini et al. |

(Continued)

OTHER PUBLICATIONS

B. Dufrasne, et al., "IBM DS8880 Architecture and Implementation (Release 8.5)", IBM Corporation, Redbooks Document SG24-8323-04, Aug. 2018, pp. 514.

(Continued)

*Primary Examiner* — Hiep T Nguyen
(74) *Attorney, Agent, or Firm* — Konrad Raynes Davda & Victor LLP; William K. Konrad

(57) ABSTRACT

In one aspect of multi-mode address mapping management in accordance with the present disclosure, mapping and unmapping operations may be conducted in one of multiple address mapping management modes to both improve overall system performance and maintain data integrity. In one embodiment, a first address mapping management mode such as a rigorous mode, for example, confirms completion of an unmapping of an address mapped data unit buffer before a re-mapping is permitted. Mapping and unmapping operations may be switched to a performance mode in which unmap completion confirmation is bypassed to improve performance. In one embodiment, address mapping management modes may be switched in real time as a function of monitored operating conditions. Other aspects and advantages are provided, depending upon the particular application.

20 Claims, 9 Drawing Sheets

(56) References Cited

U.S. PATENT DOCUMENTS

| | | | |
|---|---|---|---|
| 2005/0198446 A1 | 9/2005 | Ash et al. | |
| 2014/0310495 A1* | 10/2014 | Michelogiannakis | ........................ G06F 13/1626 711/167 |
| 2015/0169418 A1* | 6/2015 | Cardona | ............. G06F 11/2005 714/4.11 |
| 2018/0046532 A1 | 2/2018 | Ash et al. | |

OTHER PUBLICATIONS

"IBM I on Power—Performance FAQ", IBM Corporation, 2019, pp. 100.
"Logical Partition Security in the IBM~pSeries 690",IBM Corporation, Feb. 15, 2002, pp. 13.
Anonymous, "DMA Aware User Space Memory Buffer Allocation", ip.com, Jan. 28, 2013, pp. 3.
Anonymous, "Hint Set for Access Path Select", ip.com, Aug. 11, 2014, pp. 5.
S. Park, et al., "Automating Context-Based Access Pattern Hint Injection for System Performance and Swap Storage Durability" 2017, pp. 7.
S. Peter, et al., Towards High-Performance Application-Level Storage Management, 2017, pp. 5.
"Input-Output Memory Management Unit", Wikipedia, [online][retrieved Feb. 26, 2020], pp. 4, https://en.wikipedia.org/wiki/Input-output_memory_management_unit#Published_specifications.

* cited by examiner

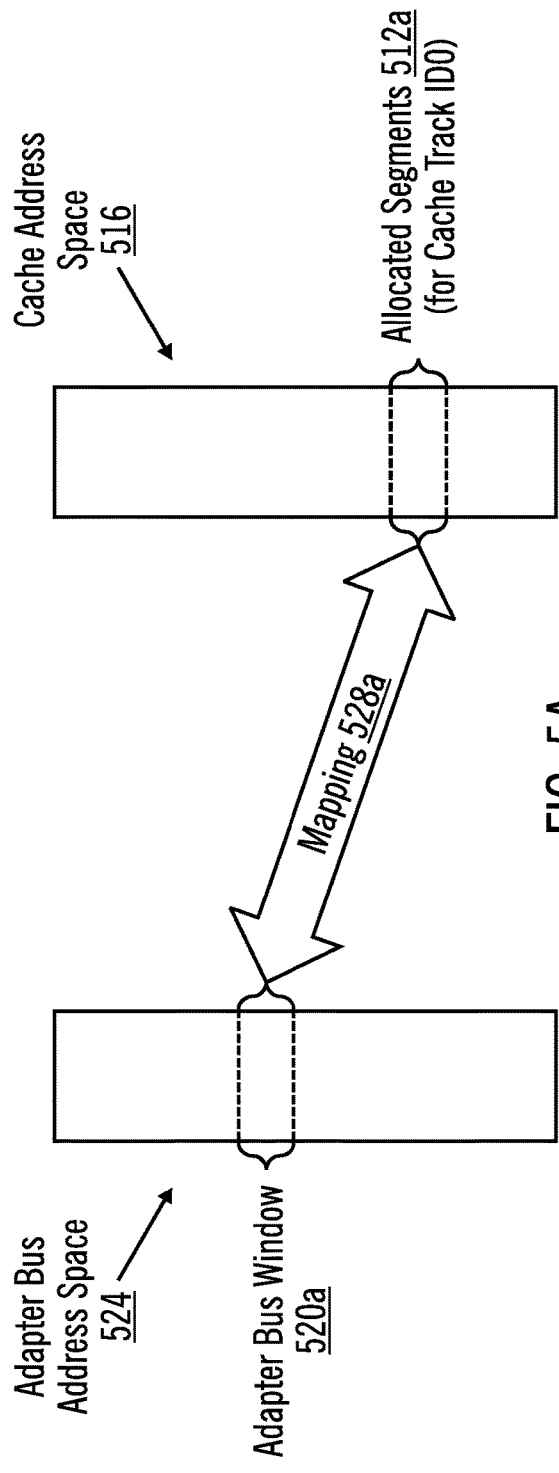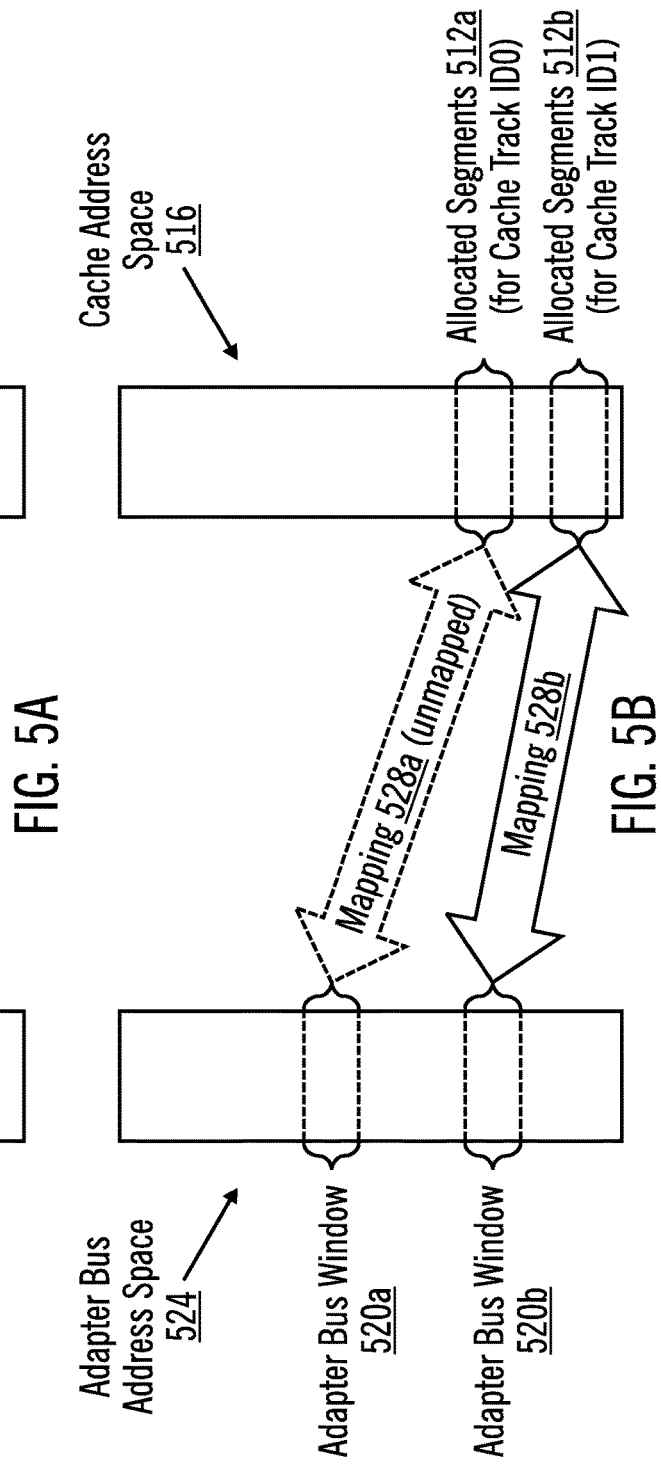

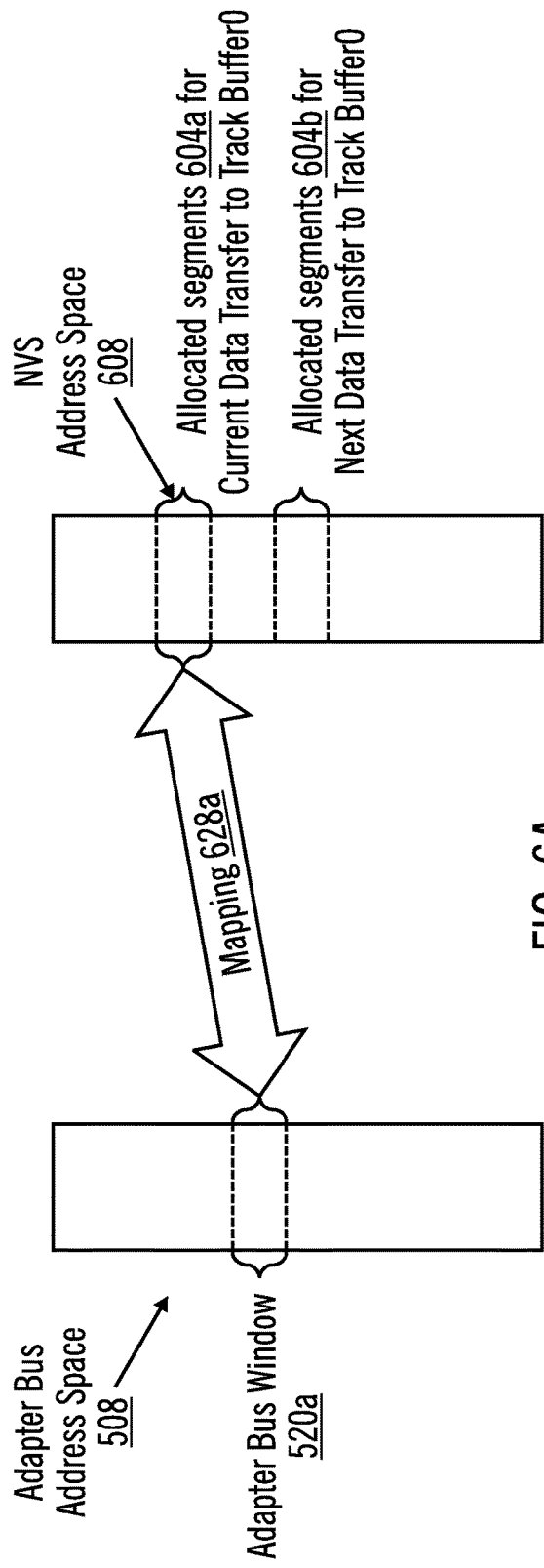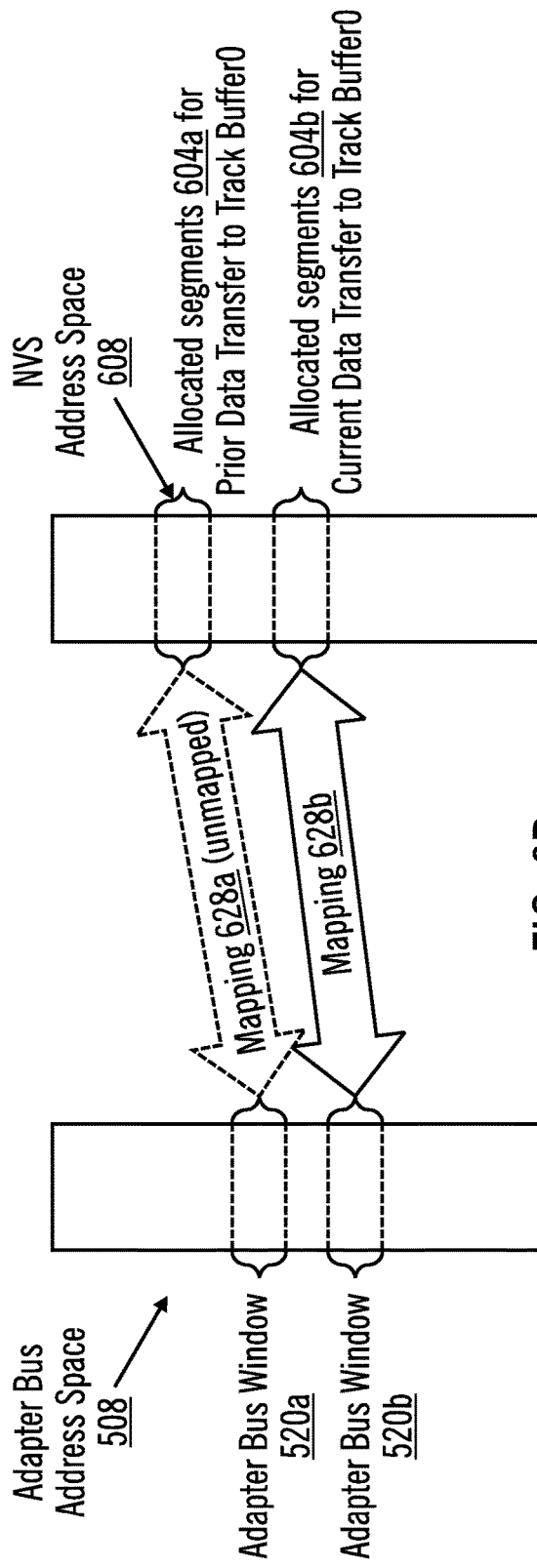
FIG. 6A
FIG. 6B

MULTI-MODE ADDRESS MAPPING MANAGEMENT

BACKGROUND

1. Field of the Invention

The present invention relates to a computer program product, computer system, and computer-implemented method for multi-mode address mapping management in a data storage system.

2. Description of the Related Art

A storage system may control access to storage for one or more host computational devices that may be coupled to the storage system over a network. A storage management application that executes in the storage system may manage a plurality of storage devices, such as disk drives, tape drives, flash drives, direct access storage devices (DASD), etc., that are coupled to the storage system. A job executing on a host may send Input/Output (I/O) commands or requests to the storage system which executes the I/O requests to read data from the storage devices or write data to the storage devices. The storage system typically includes a storage controller which controls the storage devices.

A storage controller of a storage system may include two or more servers, where each server may be referred to as a node, a storage server, a processor complex, a Central Processor Complex (CPC), or a Central Electronics Complex (CEC), for example. Each server may be included in a cluster. Each server may have a plurality of processor cores and the servers may share the workload of the storage system. In a two server configuration of the storage system referred to as a dual-server storage controller, either server can failover to the other if there is a failure or a planned downtime for one of the two servers. A hypervisor provides various supervisory services to the servers such as address mapping services, for example.

A cache is a memory which typically provides faster access to data for input/output operations as compared to storage. Data to be read may be first staged into the cache from storage and then read directly from the cache instead of directly from the storage to provide faster access to read data. Conversely, data to be updated may be first updated in the cache and then destaged to storage which is typically non-volatile storage, that is, the data persists in the non-volatile storage notwithstanding a loss of power to the storage. By comparison, some or all of the cache memory may be volatile memory, that is, data may not persist in a volatile cache in the event of a power failure.

In one known system, the storage system attempts to maintain two copies of the data while data is moving through the storage system. The servers each have two areas of their primary memory that are used for holding host data: cache and non-volatile storage (NVS). NVS contains write data until the data is safely destaged from the cache to the storage drives. When a write is sent to a volume and both the servers are operational, the write data is placed into the cache of the owning server and into the NVS of the other server. The NVS copy of the write data may be accessed if a write failure occurs and the cache is empty or possibly invalid in the owning server. Otherwise, the NVS copy of the write data may be discarded after the destage from cache to the storage drives is complete.

Each server of the storage system typically has a number of host adapters which couple the storage system to a one or more hosts. Each server of the storage system also has a number of device adapters which couple the servers of the storage system to storage such as an array of disk drives, for example. The host adapters and device adapters are typically connected to processors of the servers by one or more busses such as a Peripheral Component Interconnect Express (PCIe) bus, for example. In one known design, data transfers between an adapter at one end and the cache or the NVS of a server at the other end is accomplished by direct memory access (DMA) transfers over a PCIe bus. To facilitate the DMA transfer, a range of addresses of a source or target adapter on the PCIe bus, referred to as a PCIe window, may be mapped by the hypervisor to physical addresses of a cache or the NVS. More specifically, the PCIe window associated with an adapter may be mapped to cache memory addresses of segments of a track in a cache, or to NVS memory addresses of segments of a track buffer of the NVS. The PCIe window mapped to a cache or NVS location, points to addresses of the adapter to which data may be transferred from or transferred to in a DMA transfer.

In one known system, the hypervisor provides mapping tables such as translation control entry (TCE) tables maintained in a cache of the hypervisor, to translate addresses for the PCIe mapping. By calling a hypervisor service, a server program can cause the creation, modification, or deletion of TCE table entries in the hypervisor cache for the specific PCIe adapters assigned to that server. For example, upon completion of a DMA transfer, the mapping of a PCIe window to an associated cache track or NVS track buffer is unmapped by calling a hypervisor service "dkill" which clears the hypervisor cache of TCE table entries for mappings which are to be unmapped.

However, performance and completion of the dkill service may be delayed because the hypervisor is otherwise busy or occupied with other tasks. Accordingly, a known hypervisor dkill service sets a completion indication control register to indicate completion of the dkill cache clearance and thus completion of the unmapping of the selected PCIe window and selected NVS track buffer used for a completed DMA transfer. The hypervisor periodically polls this control register in an unmap completion polling, to check its status. If unmap completion polling determines that the control register has been set, the hypervisor reports to the requesting server that the requested dkill service and thus the requested unmapping, have been completed. Upon receipt of confirmation of completion of the requested dkill service and unmapping, the server can safely initiate another mapping. In this manner, correct mapping and unmapping of PCIe windows and NVS track buffers is facilitated.

However, unmap completion polling by the hypervisor and associated waiting for completion of unmapping can cause a significant degradation in system performance. Accordingly, in one known system, unmap completion polling by the hypervisor to check for completion of hypervisor cache clearance can be removed from the system to improve system performance.

SUMMARY

In accordance with certain embodiments, addresses for a selected data unit buffer of a storage controller and a selected adapter coupled to the storage controller, are mapped in a selected address mapping management mode, for a first data transfer between an address mapped data unit buffer and an address mapped adapter of the first data transfer. In one aspect, upon completion of the first data transfer, unmapping of the address mapped data unit buffer and the address mapped adapter of the first data transfer, is initiated in the selected address mapping management mode. In response to the selected address mapping management mode being in a first address mapping management mode such as a rigorous mode, for example, the initiated unmapping of the address mapped data unit buffer and the address mapped adapter of the first data transfer is confirmed as complete prior to again initiating another address mapping a selected data unit buffer of the storage controller and a selected adapter coupled to the storage controller, for a second data transfer between an addressed mapped data unit buffer and an address mapped adapter.

In another aspect, in response to the selected address mapping management mode being in a second address mapping management mode such as a performance mode, for example, another address mapping of a selected data unit buffer of the storage controller and a selected adapter coupled to the storage controller is initiated, for a second data transfer between an addressed mapped data unit buffer and an address mapped adapter, without confirming that the initiated unmapping of the address mapped data unit buffer and the address mapped adapter of the first data transfer is complete. As a result, confirming that the initiated unmapping of the address mapped data unit buffer and the address mapped adapter of the first data transfer is complete, is bypassed prior to again initiating address mapping a selected data unit buffer of the storage controller and a selected adapter.

In still another aspect, selecting an address mapping management mode includes monitoring the level of free data unit buffers available for an additional data transfer wherein data unit buffers are freed after completion of data transfers to those data unit buffers to be available for an additional data transfer to each free data unit buffer. The level of free data unit buffers is compared to a first threshold level such as a relatively low threshold level, for example. In response to determining that the level of free data unit buffers is below the first threshold level, selecting the first address mapping management mode.

In yet another aspect, selecting an address mapping management mode includes monitoring the level of free data unit buffers available for an additional data transfer, and comparing the level of free data unit buffers to a second threshold level such as a relatively high threshold level. In response to determining that the level of free data unit buffers is above the second threshold level, selecting the second address mapping management mode.

Another aspect of multi-mode address mapping management in accordance with the present description, is directed to determining the current selected address mapping management mode in response to determining the level of free data unit buffers to be above the second threshold level. In response to determining that the current selected address mapping management mode is the first address mapping management mode, starting a timer to start timing a first wait period prior to selecting the second address mapping management mode.

In one embodiment, a determination is made as to whether the level of free data unit buffers remains above the second threshold level during the first wait period. In response to determining that the level of free data unit buffers remains above the second threshold level during the first wait period, the second address mapping management mode is selected. Alternatively, in response to determining that the level of free data unit buffers has fallen below the second threshold level during the first wait period, the first address mapping management mode is continued.

Yet another aspect is directed to restarting the timer to start timing a second wait period in response to determining that the level of free data unit buffers has fallen below the second threshold level during the first wait period. In addition, a determination is made during the second wait period as to whether the level of free data unit buffers rises above the second threshold level. In response to determining that the level of free data unit buffers remains above the second threshold level during the second wait period, the second address mapping management mode is selected. Conversely, in response to determining that the level of free data unit buffers has fallen below the second threshold level during the second wait period, the first address mapping management mode is continued.

Still another aspect is directed to an address mapped adapter being associated with a particular data transfer and being coupled to one of a storage and a host so that the particular data transfer transfers data between the one of the storage and host coupled to the associated address mapped adapter, and an address mapped data unit buffer associated with the particular data transfer.

BRIEF DESCRIPTION OF THE SEVERAL VIEWS OF THE DRAWINGS

In the drawings, like reference numbers represent corresponding parts throughout.

FIGS. 5a, 5b depict examples of mappings and unmappings for adapter bus windows and cache in the computer environment of FIG. 1.

FIGS. 6a, 6b, 6c depict examples of mappings and unmappings for adapter bus windows and NVS in the computer environment of FIG. 1.

DETAILED DESCRIPTION

Figure 1:
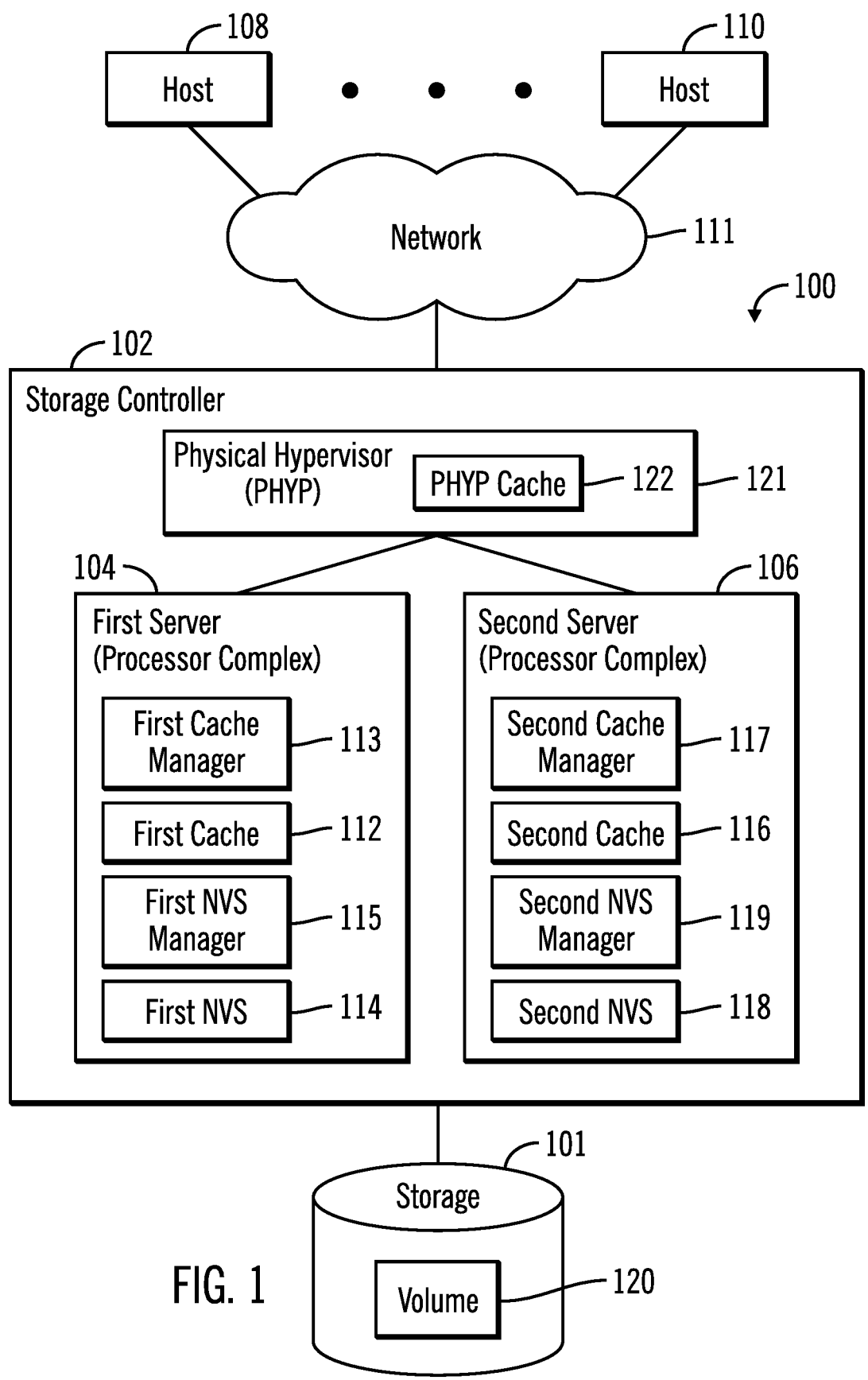
FIG. 1 illustrates, in a block diagram, a computing environment employing multi-mode address mapping management in accordance with certain embodiments.

The descriptions of the various embodiments of multi-mode address mapping management in accordance with the present disclosure, have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As noted above, a requested dkill service for unmapping an address mapping may be delayed while the hypervisor is busy with other tasks. In known systems, in order to determine when the dkill service has completed cleaning the hypervisor cache to unmap prior mappings, the hypervisor periodically polls a control register which is set upon completion of the dkill service, to check the status of that register. However, such unmap completion polling by the hypervisor can cause a significant degradation in system performance. Accordingly, in one known system, unmap completion polling by the hypervisor can be removed from the system to improve system performance. However, it is appreciated herein that such an improvement in performance may have an associated increased risk of incorrect mapping or unmapping of an NVS track buffer, for example, and a resultant data loss in some circumstances.

In one aspect of multi-mode address mapping management in accordance with the present disclosure, the mapping and unmapping (mapping/unmapping) operations of the hypervisor may be conducted in one of multiple address mapping management modes to both improve overall system performance and maintain data integrity. In one embodiment, the hypervisor may be operated in a first address mapping management mode, referred to herein as a rigorous mode, in which completion of an unmapping for an NVS track buffer is assured by unmap completion polling before a re-mapping of the same NVS track buffer is permitted.

As explained in greater detail below, the rigorous mode may be utilized as conditions warrant to prevent loss of data integrity, albeit with some potential performance degradation. However, in one aspect of multi-mode address mapping management in accordance with the present disclosure, it is recognized that as operational conditions change, the rigorous mode may no longer be appropriate or needed to ensure data integrity. Accordingly, the hypervisor may be switched in real time to a second address mapping management mode, referred to herein as a performance mode. In the performance mode, re-mapping of the same NVS track buffer is permitted without first confirming that unmapping of the prior mapping of that NVS track buffer has been completed. As a result, unmap completion polling may be bypassed in the performance mode to improve system performance without increasing the risk of data loss, as conditions warrant.

Thus, in one embodiment, operating conditions may be monitored and the address mapping management mode of the hypervisor may be automatically switched back and forth in real time between the rigorous and performance modes as appropriate to increase overall system performance while maintaining data integrity in both modes. In one embodiment, an NVS manager provides an indication to the hypervisor in the form of a "hint" as to which address mapping management mode to utilize based upon an analysis of current operating conditions.

For example, it is recognized herein that if data transfer operations select from available NVS track buffers in a sequential fashion such as a round robin sequence, for example, and that the I/O workload is low such that there is an adequate supply of available track buffers, any one NVS track buffer for which unmapping has previously been requested, will likely not be selected again for a relatively long intervening period of time. Accordingly, if the unmapping of a particular NVS track buffer did not complete in response to the dkill service requested to unmap that particular NVS buffer, it is appreciated that subsequent dkill service requests to unmap other NVS track buffers in the intervening period are likely to complete the unmapping of the particular NVS track buffer as well. Accordingly, a performance mode may be employed which bypasses unmap completion polling operations employed by the rigorous mode to improve system performance when I/O workload is sufficiently low.

Conversely, if the I/O workload is sufficiently high, it is appreciated that an unmap completion polling operation of the rigorous mode may be appropriate to ensure that the unmapping has been completed before proceeding to the next mapping. For example, it is recognized herein that if the I/O workload is relatively high such that the supply of available NVS track buffers is relatively low, any one NVS track buffer for which unmapping has previously been requested, has an increased likelihood of being selected again in a relatively short intervening period of time.

Accordingly, if the unmapping of a particular NVS track buffer did not complete in response to the dkill service previously requested to unmap that particular NVS buffer, it is appreciated that there may be an insufficient number of subsequent dkill service requests to unmap other NVS track buffers in the intervening period to ensure completion of the unmapping of the particular NVS track buffer as well. Accordingly, in high I/O workload conditions, the current address mapping management mode may employ the rigorous mode such that unmap completion polling of the rigorous mode is utilized. As a result, in the rigorous mode, operations do not proceed to the next mapping without first waiting for the prior unmapping to complete. In this manner, data integrity may be preserved notwithstanding relatively high levels of I/O workload.

Thus, in one embodiment, address mapping management operations may switch back and forth between the rigorous mode and the performance mode automatically and in real time as a function of the level of the I/O workload, for example. It is appreciated that the level of I/O workload may be monitored and measured using a variety of techniques for purposes of selecting an appropriate address mapping management mode as a function of I/O workload level. In one embodiment, the number of free NVS track buffers may be monitored and an address mapping management mode may be selected as a function of the current number of free NVS track buffers. It is appreciated that address mapping management modes may be selected as a function of other criteria, depending upon the particular application.

A system of one or more computers may be configured for multi-mode address mapping management in accordance with the present description, by virtue of having software, firmware, hardware, or a combination of them installed on the system that in operation causes or cause the system to perform with multi-mode address mapping management in accordance with the present description. For example, one or more computer programs in computer-readable memories may be configured to perform with multi-mode address mapping management by virtue of including instructions that, when executed by data processing apparatus such as for example a storage controller processor, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable program code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

FIG. 1 illustrates a block diagram of a computing environment comprising a storage system 100 which includes storage 101 controlled by a dual cluster storage controller 102. In this embodiment, the storage controller 102, which may an IBM Enterprise Storage Server (ESS), for instance, is a high-capacity device that can back up data from a variety of different storage devices. For example, a large corporation or other enterprise may have a network of servers that each store data for a number of workstations used by individual employees. Periodically, the data on the host servers is backed up to the high-capacity storage controller 102 to avoid data loss if the host servers malfunction. The storage controller 102 can also provide data sharing between host servers since it is accessible to each host server. The storage controller 102 itself has redundant storage resources to provide an additional safeguard against data loss. As a further measure, the data of the storage controller 102 may be mirrored to another storage server, typically at a remote site. A storage server of a particular type, such as one that uses disk storage, may connect to one or more other peer disk storage servers as well as to other storage devices, such as those using magnetic tape. Communication between the devices may be achieved using any desired communication protocol and medium. A user interface may be provided to allow a user to access information regarding the status of the storage controller 102.

In this example, the storage controller 102 is a dual cluster system comprising a first server 104 and a second server 106, where the storage controller 102 communicates with a plurality of hosts 108 . . . 110 over a network 111, in accordance with certain embodiments. A job executing on a host 108, 110 may send Input/Output (I/O) commands or requests to the storage system 100. Each server 104, 106 includes a storage manager which executes the I/O requests to read data from the storage devices 101 or write data to the storage devices 101 which store data in volumes 120, for example.

The storage controller 102, the servers 104, 106 and the hosts 108, 110 may comprise any suitable computational device including those presently known in the art, such as, a personal computer, a workstation, a server, a mainframe, a handheld computer, a palm top computer, a telephony device, a network appliance, a blade computer, a processing device, a controller, etc. The plurality of servers 104, 106 may provide redundancy because if one server undergoes a failure from which recovery is not possible, an alternate server may perform the functions of the server that failed. Each of the plurality of servers 104, 106 may be referred to as a processing complex of a cluster and may include one or more processors and/or processor cores.

The storage controller 102, the servers 104, 106, the hosts 108, 110 and the storage 101, may be elements in any suitable network 111, such as, a storage area network, a wide area network, the Internet, an intranet. In certain embodiments, storage controller 102, the servers 104, 106, the hosts 108, 110 and the storage 101, may be elements in a cloud computing environment.

The first server 104 includes memory comprising a first cache 112 and a first NVS 114, and the second server 106 includes memory comprising a second cache 116 and a second NVS 118. The caches 112, 116 may be controlled by cache managers 113, 117, respectively, which are part of the respective storage manager of the server 104. Similarly, the NVS's 114, 118 may be controlled by NVS managers 115, 119, respectively, which are part of the storage manager of the server 106. For the purposes of this disclosure, operations shown as being performed by a cache are performed under control of a cache manager 113, 117 and operations shown as being performed by an NVS are performed under control of an NVS manager 115, 119.

The storage managers including the cache managers 113, 117, the NVS managers 115, 119, and a hypervisor 121 execute software, firmware and/or micro code, e.g., computer code devices, stored in an associated memory to achieve the functionality described herein. Such memories may be considered to be program storage devices. The memories may be provided, e.g., in a region of the respective cache that is preserved during a reboot, or in a separate non-volatile memory.

The cache 112, 116 may in certain embodiments, comprise a write cache partitioned into one or more ranks, where each rank may include one or more storage tracks. The cache 112, 116 may be any suitable cache known in the art or developed in the future. In some embodiments, the cache 112, 116 may be implemented with a volatile memory and/or non-volatile memory such as a multi-tier cache having a relatively fast cache tier implemented with DRAM type memory, for example, and a relatively slow cache tier implemented with NAND type flash memory, for example. The cache 112, 116 may store both modified and unmodified data, where the cache 112,116 may periodically destage (i.e., move) data from the cache 112, 116 to storage drives 101 controlled by the servers 104, 106.

The NVS 114, 118 may also be referred to as a "persistent" cache and is implemented with non-volatile memory that may or may not utilize external power to retain data stored therein. In some embodiments, a backup power source, such as a battery, supplies the NVS 114, 118 with power to retain the data stored therein in case of power loss. The NVS 114, 118 may store modified data. An application is made aware that an I/O operation is complete once data has successfully been written to cache and the NVS. Data integrity and availability is maintained by retaining two copies of the data until it is hardened to disk, one copy in cache on one server and the second in NVS of the other server. NVS may be protected by battery backup. Normal access to the data is from the copy retained in the cache. In certain embodiments, the NVS 114, 118 may also act like a write cache.

Generally, if data requested by a host resides in one of the caches 112, 116, an immediate data transfer takes place. If the data is not in the caches, one of the servers 104, 106 sends a request to its device adapter to retrieve the data from the disk arrays of the storage 101. When a read operation arrives at a server, a cache hit occurs if the requested data resides in the cache, resulting in better performance. A cache miss occurs if the data is not in the cache. In response to a cache miss, a stage operation occurs, which involves reading data from a disk drive of storage 101 into the appropriate cache. The NVS's 114, 118, which are battery backed memories or solid state nonvolatile storage in this embodiment, improve performance by allowing write I/O operations to complete after the data is stored in NVS, but before the data is destaged to the disk arrays of storage 101. If a server fails, the surviving server can access the write data of the failed server in its local NVS. The caches 112, 116 may be volatile memories that are not battery backed or may include non-volatile storage in some embodiments.

A physical hypervisor (PHYP) 121 is in one embodiment, a component of system firmware of the storage controller 102 and provides capabilities to allow one portion of memory of a server to be used as cache and another portion be used as NVS. The PHYP 121 has a cache 122 and allows the contents of the NVS 114, 118 and cache 112, 116 to be protected in a "memory preserve cache" managed by the PHYP 121 in case of a reboot. The PHYP 121 may execute in any or all of the servers 104, 106. In certain embodiments, the PHYP 121 may be implemented in software, firmware, hardware or any combination thereof, instead of or in addition to being implemented in the system firmware.

It should be noted that the storage controller 102 may be configured and accessed in many different ways. For example, virtualization may be performed to access the hardware elements of the storage controller 102. Additionally, in certain embodiments, the storage controller 102 may have a single server or more than two servers.

Figure 2:
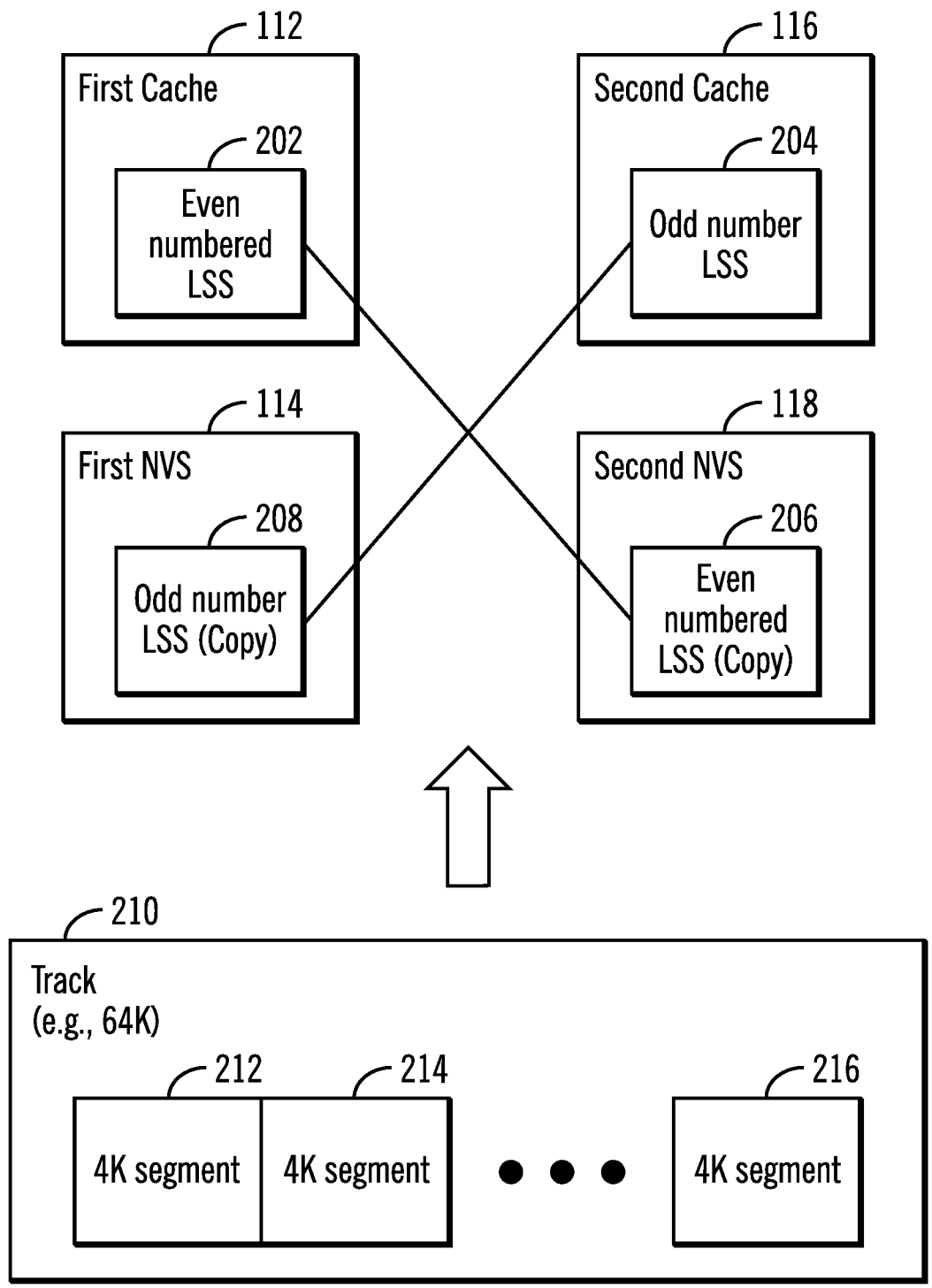
FIG. 2 depicts an example of I/O workload sharing in connection with a first cache and a first NVS controlled by a first server, and a second cache and a second NVS controlled by a second server, in accordance with certain embodiments.

The I/O workload of the storage controller 102 may be shared by the servers 104, 106. FIG. 2 depicts one example of such workload sharing in connection with first cache 112 and the first NVS 114 controlled by the first server 104 (FIG. 1), and the second cache 116 and the second NVS 118 controlled by the second server 106, in accordance with certain embodiments. In this example, the first cache 112 is used for all logical volumes 120 (FIG. 1) that are members of even numbered logical storage systems (LSS) 202. It may be noted that an LSS is a logical construct that groups logical volumes and logical units (LUN) in groups, where in certain embodiments the LSS's may be numbered via integers starting from 0 to and ending at 255 if there are 256 LSS's. Likewise, the second cache 116 is used for all logical volumes 120 (FIG. 1) that are members of odd numbered LSS's 204. For every write that is placed into the first cache 112 of the first server 104, a copy 206 is placed into the second NVS 118 that is in the second server 106. For every write that is placed into the second cache 116 of the second server 106, a copy 208 is placed into the first NVS 114 that is in the first server 104. As a result, in case of failure of the first server 104, the second server 106 may be used for recovery of data, and in case of failure of the second server 106 the first server 104 may be used for the recovery of data.

In certain embodiments, each track (an exemplary track 210 is shown) may include multiple segments of 4 Kbytes in size. Thus, in this example, a track is divided into segments of sectors, which may comprise a basic unit of storage. The exemplary track 210 of FIG. 2 has up to 17 segments as represented by the segments 212, 214 . . . 216, where a track 210 is allocated to the cache 112, 116 in segments of 4 Kbytes, i.e., a subset of segments of the track 210 may reside in the cache 112, 116. In a similar manner, a track buffer may be allocated to an NVS 114, 118 in segments of 4 Kbytes, i.e., a subset of segments of a track buffer may reside in an NVS 114, 118.

As noted above with respect to FIG. 2, for every write that is placed into the first cache 112 of the first server 104, a copy is placed into the NVS 118 that is in the second server 106. Thus, the following normal flow of data is for a write from a host when both the first server 104 and the second server 106 are operational:

(1) Data is written to cache 112 in the first server 104. At the same time, data is written to NVS 118 of the second server 106;
(2) The write operation is reported to the host as completed;
(3) The write data is destaged from the first cache 112 of the first server 104 to a storage drive array; and
(4) The write data is discarded from the NVS 118 of the second server 106.

Therefore, the cache has both modified and unmodified data for a track, whereas the NVS typically has modified data. When a track gets destaged to a disk, the track is then unmodified, and the track may then be discarded from the NVS as the NVS only stores modified data in one embodiment.

Therefore a host writes to both the cache 112 and NVS 118 in parallel. A write to cache takes place in two phases. In the first phase track access is taken and the track is associated with a "write in progress". Then in a second phase the track access ends and the write completes. When a host writes a track into NVS, a commit is performed to indicate that write is complete.

Figure 3:
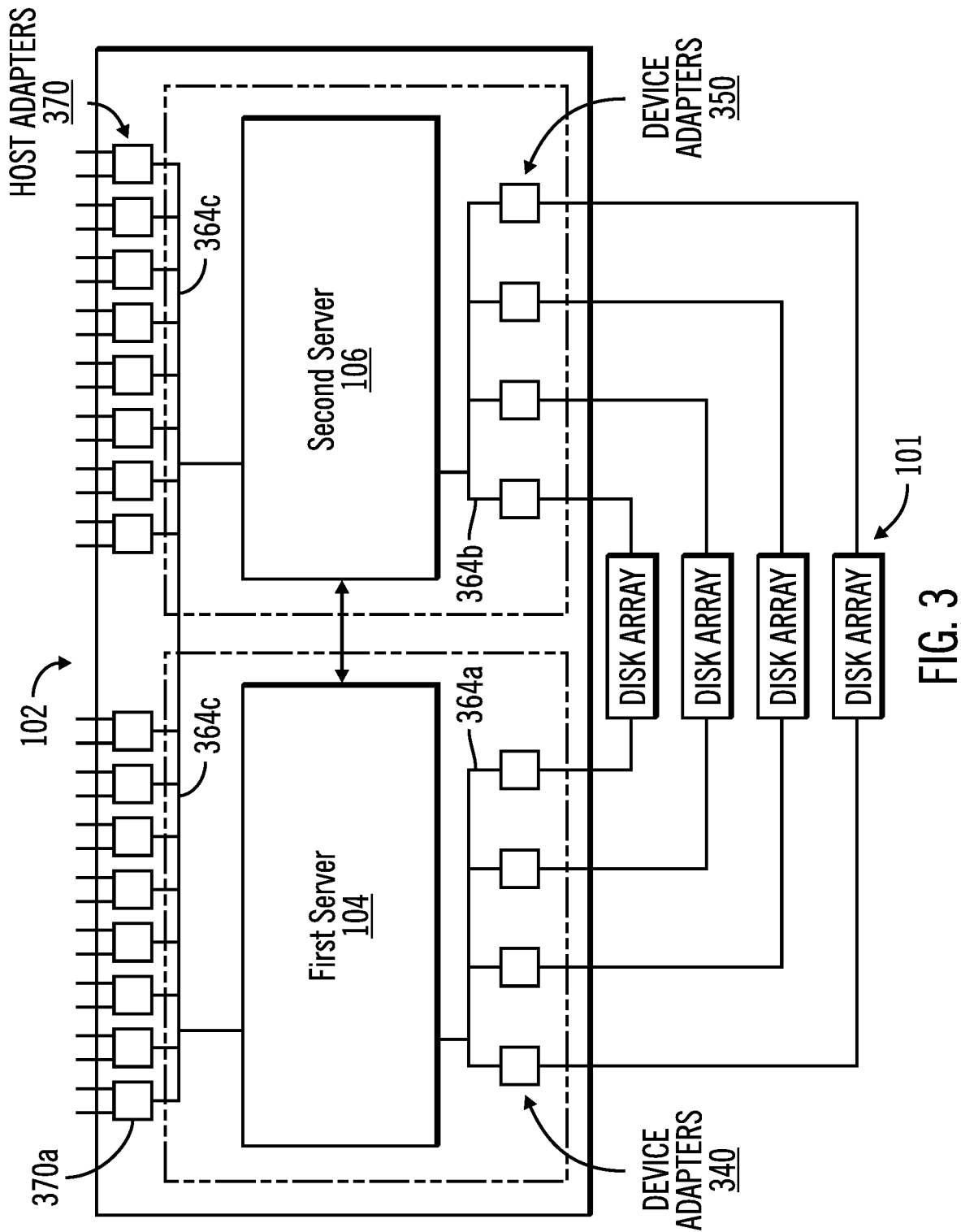
FIG. 3 illustrates, in a block diagram, host adapters and device adapters for the servers of the storage controller of FIG. 1.

Referring to FIG. 3, device adapters (DA) 340, 350 are used to connect the disks of a disk array of the storage 101 to the caches 112, 116 in the servers 104, 106 (FIG. 1). In one possible design, each server 104, 106 is assigned four device adapters 340, 350, respectively. Each adapter is part of a pair, one on each server. A pair supports two independent paths to all of the disk drives served by the pair. Each disk array is configured to be accessed by only one of the servers. However, if a server failure occurs, the surviving server automatically takes over all of the disks. The disk arrays or ranks of the storage 101 can be configured as RAID 5 (redundant array of independent disks) or non-RAID arrays. Alternatively, another high-capacity storage medium may be used. The device adapters 340, 350 are connected to the servers 104, 106 (FIG. 1) by a suitable bus or network connection. In the illustrated embodiment, PCIe busses 364a, 364b connect device adapters 340, 350 to servers 104, 106, respectively. Accordingly, data transfers between the device adapters 340, 350 and servers 104, 106 take place over the PCIe busses 364a, 364b. Although the connections between device adapters 340, 350 and servers 104, 106, are described as PCIe busses, it is appreciated that other types of bus or network connections may be employed, depending upon the particular application.

Host adapters (HA's) 370 are external interfaces that may support two ports, in one embodiment, e.g., either small computer systems interface (SCSI) or IBM's enterprise systems connection (ESCON), which is an Enterprise Systems Architecture/390 and zSeries computer peripheral interface. In one embodiment, this I/O interface uses ESA/390 logical protocols over a serial interface that configures attached units to a communication fabric of the network 111 (FIG. 1). For example, a remote storage server, host servers and a user interface may communicate with the storage controller 102 via the HA's. Fibre channel or Fibre-channel connection (FICON) has support for one channel per HA. Each HA connects to both servers 104, 106, so that either server can handle I/Os from any host adapter. A system adapter identification number (SAID) is a unique identification number automatically assigned to each HA. The storage controller 102 contains four host-adaptor bays, each of which is connected to both servers 104, 106 for redundancy. In the illustrated embodiment, PCIe bus 364c connects host adapters 370 to servers 104, 106. It is appreciated that other types of bus or network connections may be employed, depending upon the particular application.

A host may have data stored into storage 101 (FIG. 1) via the storage controller 102 by issuing a write request to a host adapter 370 (FIG. 3) such as the host adapter 370a, for example. The write request may include a track identification (ID) which identifies the track for which the data is to be stored. In response, the host adapter 370a receiving the write request sends mail to the appropriate cache manager for that track ID such as the cache manager 113 (FIG. 1), for example, informing the cache manager 113 of the write request for a particular track ID such as track ID0, for example. The location of the track ID0 write data within the host adapter 370a is also identified.

Figure 4:
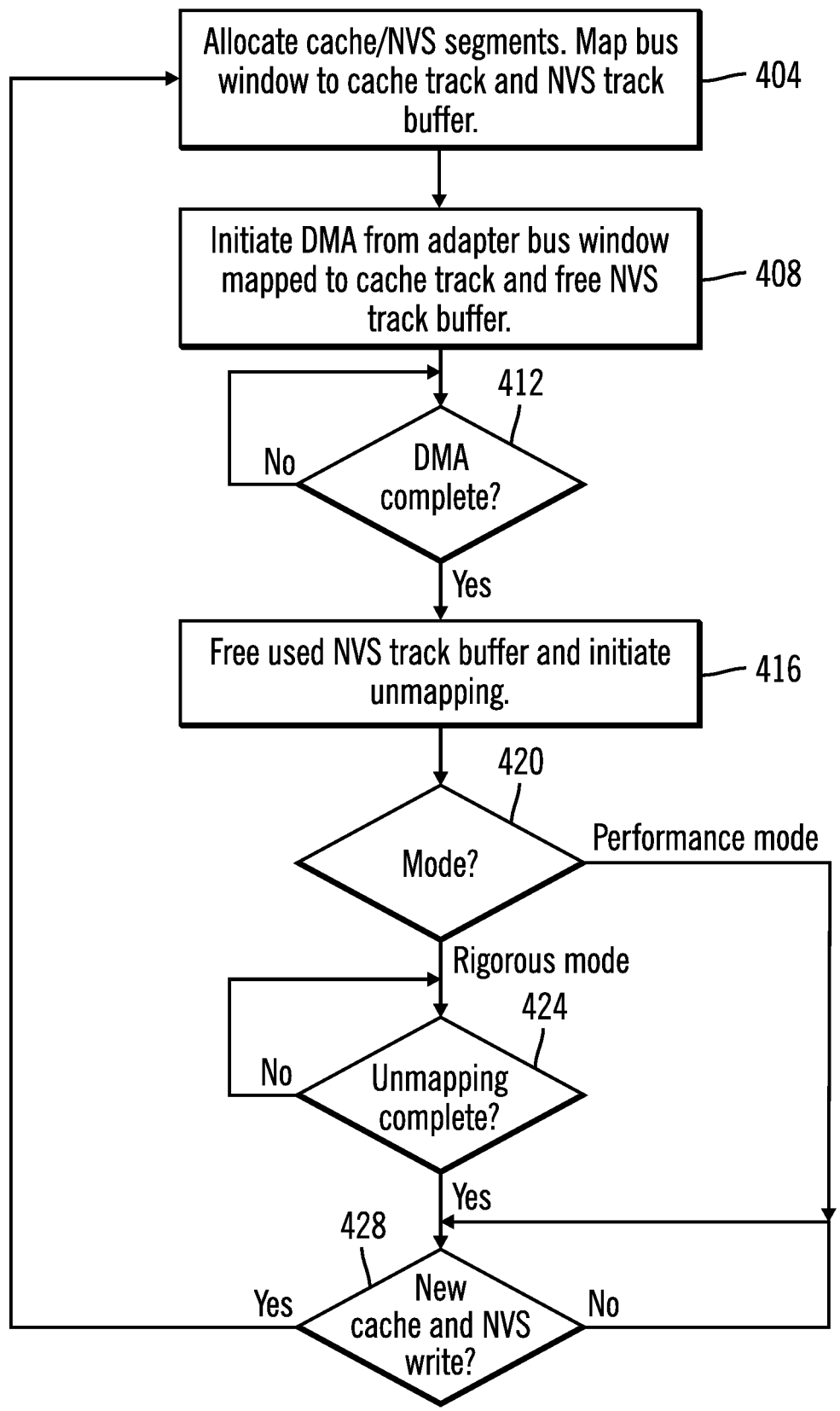
FIG. 4 illustrates, in a flowchart, an example of operations for multi-mode address mapping management in accordance with certain embodiments.

FIG. 4 depicts one example of operations 404-428 for which one or more of the cache manager 113 (FIG. 1), NVS manager 119 and physical hypervisor 121 have been configured. In this example, one or more of the cache manager 113 (FIG. 1), NVS manager 119 and physical hypervisor 121 have been configured for mapping and unmapping management operations in accordance with the present description, for transferring write data from a host adapter such as the host adapter 370a, to cache and NVS. Although the logic performing the operations of FIG. 4 are described in connection with the cache manager 113 (FIG. 1), NVS manager 119 and physical hypervisor 121 in the illustrated embodiment, it is appreciated that logic performing such management operations may be located in fewer devices or in other devices, depending upon the particular application.

In response to the mail from the host adapter 370a informing the cache manager 113 of the write request for a particular track ID such as track ID0, for example, the cache manager 113 in this example, allocates (block 404, FIG. 4) segments 512a (FIG. 5a) in the cache 112 for cache track ID0. The segments 512a of cache track ID0 are allocated to receive the write data identified by track identification ID0, in a DMA transfer (block 408, FIG. 4) by the cache manager 113 of the server 104, from the identified location within the host adapter 370a to the allocated segments 512a (FIG. 5a) for the cache track ID0 of the cache address space 516 of the cache 112 (FIG. 1) of the server 104. In the illustrated embodiment, the identified location of the write data for the cache track ID0 within the host adapter 370a (FIG. 3), corresponds to a PCIe window identified as adapter bus window 520a (FIG. 5a) in this example, of the adapter bus address space 524. As explained in greater detail below, to facilitate the DMA transfer of the write data to the cache track ID0 of the cache 112 from the host adapter 370a, the cache manager 113 causes the physical hypervisor 121 (FIG. 1) to map (block 404, FIG. 4) in a mapping 528a (FIG. 5a), the adapter bus window 520a to the allocated segments 512a for the cache track ID0 as represented by an address mapping arrow in FIG. 5a.

As previously mentioned, data writes to the cache 112 of the server 104 are also written to the NVS 118 of the other server 106 to provide a backup in the event the write data in the cache 112 is lost before it has been committed to storage 101. More specifically, for each write to a cache track in the cache 112, the same data is written to a track buffer in the NVS 118. Once the write data has been safely destaged from the cache track to the storage 101, the write data in the corresponding track buffer of the NVS 118 may be discarded, freeing the allocated segments of that track buffer for use for another data write. In some embodiments, the NVS 118 may support up to 4000 track buffers, for example. These track buffers may be used in a round robin fashion, for example, cycling through the available track buffers by selecting the next available track buffer in sequence.

Accordingly, in response to the mail from the host adapter 370a informing the cache manager 113 of the requested write to the cache 112, the cache manager 113 also requests the NVS manager 119 to allocate (block 404, FIG. 4) segments 604b (FIG. 6a) in the NVS 118 of the NVS address space 608, for an available track buffer such as the track buffer0, for example. However, for reasons of system performance, the allocation of segments 604b for the track buffer0 is for the next data transfer using the NVS track buffer0 rather than for the current transfer to the NVS track buffer0. Instead, the current DMA data transfer will utilize the segments 604a which were previously allocated for the track buffer0 in connection with a prior data transfer.

The NVS allocated segments 604a for the current data transfer to the track buffer0 receive the write data identified by track identification ID0, in a DMA transfer (block 408, FIG. 4) by the NVS manager 119 of the server 106 from the identified location within the host adapter 370a to the segments 604a allocated for the track buffer0 of the NVS address space 608. As previously mentioned, in this example, the identified location of the write data for track identification ID0 within the host adapter 370a, corresponds to the PCIe window identified as adapter bus window 520a in this example, of the adapter bus address space 508. To facilitate the DMA transfer (block 408, FIG. 4) of the ID0 write data from the host adapter 370a to the NVS track buffer0, the cache manager 113 and/or the NVS manager 119 informs the physical hypervisor 121 that the NVS destination of the ID0 write data is the NVS track buffer0 and causes the physical hypervisor 121 (FIG. 1) to map in a mapping 628a (FIG. 6a), the adapter bus address window 520a to the segments 604a previously allocated for the current data transfer to the NVS track buffer0, as represented by an address mapping arrow (FIG. 6a), as explained in greater detail below. Although described herein in connection with a DMA transfer in the illustrated embodiment, it is appreciated that data transfers between adapters and cache and NVS memory may be accomplished through any suitable data transfer procedure.

Upon completion (block 412) of the DMA transfers to the cache track ID0 and to the NVS track buffer0, the cache manager 113 and/or the NVS manager 119 frees (block 416, FIG. 4) the track buffer0 for use for another data transfer and initiates unmapping the mappings 528a, 628a. In this embodiment, the hypervisor 121 provides mapping tables such as translation control entry (TCE) tables to translate addresses for the mapping. By calling a hypervisor service, a server program can cause the creation, modification, or deletion of TCE table entries for the specific PCI adapters assigned to that server. Thus in this example, the cache manager 113 and/or the NVS manager 119 can cause the hypervisor 121 to create suitable TCE table entries to implement the mappings 528a, 628a (block 408, FIG. 4) by calling a suitable hypervisor TCE service. In a similar manner, the cache manager 113 and/or the NVS manager 119 can initiate (block 416, FIG. 4) the unmapping of the mappings 528a, 628a by calling a dkill hypervisor service to cause the hypervisor 121 to delete the TCE table entries for the mappings 528a, 628a, by clearing those TCE table entries from the hypervisor cache 122.

However, it is appreciated herein that performance and completion of the dkill service may be delayed because the hypervisor 121 is otherwise busy or occupied with other tasks. In one aspect of multi-mode address mapping management in accordance with the present disclosure, the mapping and unmapping (mapping/unmapping) operations of the hypervisor 121 may be conducted in one of multiple address mapping management modes to both improve overall system performance and maintain data integrity.

In one embodiment, the hypervisor 121 may be operated in a first address mapping management mode, referred to herein as a rigorous mode, in which completion of an unmapping for an NVS track buffer is confirmed before a re-mapping of the same NVS track buffer is permitted. As explained in greater detail below, the rigorous mode may be utilized as conditions warrant to prevent loss of data integrity. However, as conditions change and the rigorous mode is no longer appropriate to ensure data integrity, the hypervisor 121 may be switched to a second address mapping management mode, referred to herein as a performance mode. In the performance mode, re-mapping of the same NVS track buffer is permitted without first confirming that unmapping of the prior mapping of that NVS track buffer has been completed.

The performance mode may be utilized as conditions warrant to improve system performance without increasing the risk of data loss. For example, as explained in greater detail below in connection with FIG. 7, operating conditions may be monitored and the address mapping management mode of the hypervisor automatically switched back and forth in real time between the rigorous and performance modes as appropriate to increase overall system performance while maintaining data integrity in both modes. In one embodiment, the NVS manager 119 provides an indication to the hypervisor 121 in the form of a "hint" as to which address mapping management mode to utilize based upon an analysis of current conditions such as that depicted in FIG. 7, for example.

Accordingly, a determination is made (block 420, FIG. 4) as to the current address mapping management mode being utilized by the hypervisor 121. In response to a determination that the current address mapping management mode is the rigorous mode, for example, a determination is made (block 424) as to whether the unmapping of the NVS buffer in response to a dkill service request, is complete. In this example, the cache manager 113 and/or the NVS manager 119 has requested (block 416, FIG. 4) the hypervisor 121 to perform the dkill service to initiate the unmapping of the prior mapping 628a (FIG. 6a) of the NVS track buffer0.

In this embodiment, the hypervisor dkill service sets a completion indication control register to indicate completion of the dkill cache clearance to delete the TCE table entries. In this example, upon clearance of the hypervisor cache 122, the TCE table entries for the PCIe window to NVS buffer track0 mapping 628a will be deleted which will complete the unmapping of the mapping 628a. Accordingly, the hypervisor 121 periodically polls (block 424, FIG. 4) this control register in the rigorous mode, to check the status of the control register status to determine if the unmapping of the prior mapping 628a has been completed.

Once the clearing of the hypervisor cache 122 has been completed and thus the unmapping of the prior NVS track buffer0 mapping 628a has been completed, the control register is set to indicate completion of the unmapping. Polling of the control register detects the setting of the control register and the hypervisor 121 reports to the requesting server 104, 106 that the requested dkill service and thus the requested unmapping has been completed. FIG. 5b indicates successful unmapping of the prior mapping 528a by representing the mapping 528a in the unmapped state with a dashed line arrow. In a similar manner, FIG. 6b indicates the mapping 628a in the unmapped state with a dashed line arrow.

In one aspect of multi-mode address mapping management in accordance with the present description, in the rigorous mode, a new mapping for an NVS track buffer is not undertaken until the unmapping of the prior mapping has been confirmed. Accordingly, once the unmapping of the prior mappings 528a, 628a, has been confirmed (block 424, FIG. 4) in the rigorous mode, another mapping may be initiated for another write to the cache and NVS.

In a manner similar to that described above in connection with a write to cache track ID0, in response to mail from a host adapter such as the host adapter 370a, for example, informing the cache manager 113 of another write request (block 428, FIG. 4) for a particular track ID such as track ID1, for example, the cache manager 113 again allocates (block 404, FIG. 4) segments 512b (FIG. 5b) in this example, in the cache 112 for cache track ID1 of the cache address space 516 of the cache 112 (FIG. 1) of the server 104. The segments 512b are allocated for cache track ID1 to receive the write data identified by track identification ID1, in a DMA transfer (block 408, FIG. 4) by the cache manager 113 of the server 104, from the identified location within the host adapter 370a to the allocated segments 512b (FIG. 5b) for the cache track ID1. In the illustrated embodiment, the identified location of the write data for the cache track ID1 within the host adapter 370a, corresponds to a PCIe window identified as adapter bus window 520b (FIG. 5b) in this example, of the adapter bus address space 524. To facilitate the DMA transfer of the write data for the cache track ID1 from the host adapter 370a to the cache 112, the cache manager causes the physical hypervisor 121 (FIG. 1) to map (block 404, FIG. 4) in an address mapping 528b (FIG. 5b), the adapter bus window 520b to the allocated segments 512b for the cache track ID1 as represented by a solid line address mapping arrow in FIG. 5b.

In a manner similar to that described above in connection with a write to allocated segments 604a of NVS track buffer0, in response to the mail from the host adapter 370a informing the cache manager 113 of another requested write to the cache 112, the cache manager 113 also requests the NVS manager 119 to allocate (block 404, FIG. 4) segments (not labeled) in the NVS 118 of the NVS address space 608, for an available track buffer such as the track buffer0, for example. Here too, the allocation (block 404, FIG. 4) of segments for the track buffer0 is for the next data transfer using the NVS track buffer0 rather than for the current transfer to the NVS track buffer0. Instead, the current DMA data transfer will utilize the segments 604b which were previously allocated (FIG. 6a) for the track buffer0 in connection with the prior data transfer using the mapping 628a as described above.

The NVS allocated segments 604b for the current data transfer to the track buffer0 receive the write data identified by track identification ID1, in a DMA transfer (block 408, FIG. 4) by the NVS manager 119 of the server 106 from the identified location within the host adapter 370a to the segments 604b allocated for the track buffer0 of the NVS address space 608. As previously mentioned, in this example, the identified location of the write data for track identification ID1 within the host adapter 370a, corresponds to the PCIe window identified as adapter bus window 520b in this example, of the adapter bus address space 508. To facilitate the DMA transfer (block 408, FIG. 4) of the ID1 write data from the host adapter 370a to the NVS track buffer0, the cache manager 113 and/or the NVS manager 119 informs the physical hypervisor 121 that the NVS destination of the ID1 write data is the NVS track buffer0 and causes the physical hypervisor 121 (FIG. 1) to map the adapter bus address window 520b to the segments 604b allocated for the current data transfer to the NVS track buffer0, as represented by an address mapping 628b (FIG. 6b).

Because the completion of the unmapping of the prior mapping 628a was confirmed (block 424, FIG. 4) in the rigorous mode before the mapping 628b was initiated (block 404, FIG. 4), the correct mapping of the adapter bus window 520b to the previously allocated segments 604b of the track buffer0 for the current data transfer of FIG. 6b is assured. Absent the rigorous mode of multi-mode address mapping management of the present description, the mapping 628b (FIG. 6b) might be initiated before the unmapping of the prior mapping 628a for the NVS track buffer0 is completed. For example, the hypervisor cache cleaning service dkill may not have been completed such that the TCE table entries for the prior mapping 628a for the NVS track buffer0 may remain in cache 121 resulting in a possible corruption of the next mapping 628b for the NVS track buffer0.

Figure 6C:
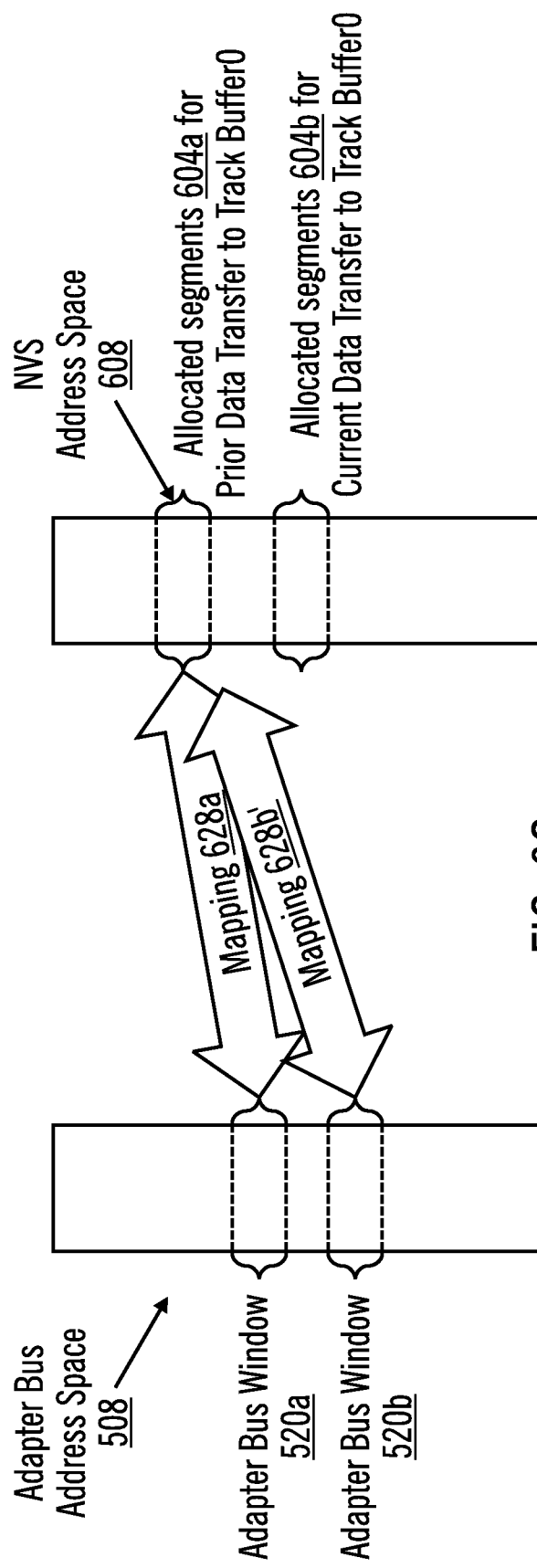

FIG. 6c depicts an example of a corrupted mapping 628b' which maps the adapter bus window 520b to the wrong segments, that is segments 604a of the prior data transfer, rather than the correct segments 604b for the current data transfer because the TCE table entries for the prior mapping 628a were not deleted from the hypervisor cache 122 prior to the new mapping 628b'. For example, TCE table entries for the prior mapping 628a which have not yet been deleted may indicate incorrectly that the NVS segments currently allocated for the track buffer0 are the NVS segments 604a instead of the correct segments 604b, leading to the incorrect mapping 628b' of FIG. 6c. As a result of an incorrect mapping such as the incorrect mapping 628b' of FIG. 6c, an adapter bus window such as the adapter bus window 520b may be mapped to the wrong NVS segments resulting in a new DMA transfer being directed to the wrong location in the NVS. In addition, prior data at that location may be incorrectly overwritten because the data may yet be needed for backup purposes. Operating the hypervisor 121 in the rigorous mode of mapping and unmapping operations reduces or eliminates incorrect mappings which may result from incomplete hypervisor cache cleaning.

In one aspect of multi-mode address mapping management in accordance with the present description, it is recognized that mapping/unmapping operations in the rigorous mode may not always be needed to assure correct mappings and data integrity. More specifically, a performance mode may be employed which bypasses certain operations of the rigorous mode such as unmap completion polling, to improve system performance. In one embodiment, mapping/unmapping operations may automatically switch back and forth between the rigorous mode and the performance mode in real time as a function of the level of the I/O workload. For example, it is appreciated that when the I/O workload is low, the duration in time between a use of a particular NVS track buffer and a subsequent reuse of that same NVS track buffer tends to be a relatively long duration of time particularly when the NVS has a relatively large number of available track buffers for use. It is further appreciated that the longer the duration of time between use and subsequent reuse of a particular NVS track buffer, the greater the opportunity for a dkill operation to complete, cleaning the hypervisor cache 122 (FIG. 1) and completing the unmapping of the prior mapping of the particular NVS track buffer before that particular track buffer is remapped again.

Thus, if the I/O workload is sufficiently low, it is appreciated that the unmap complete polling operation of the rigorous mode (block 424, FIG. 4) to ensure that the unmapping has been completed before proceeding to the next mapping, may be bypassed in a performance mode. It is noted that the unmap completion polling (block 424, FIG. 4) of the rigorous mode may have a substantial adverse effect on performance. Accordingly, if the I/O workload is sufficiently low, the current address mapping management mode may employ the performance mode (block 420, FIG. 4) instead of the rigorous mode, such that unmap completion polling (block 424, FIG. 4) by the hypervisor 121 may be bypassed and operations may proceed to the next data write and next mapping (block 428, FIG. 4) without waiting for the unmapping to complete. In this manner, a substantial performance gain may be obtained in the performance mode without sacrificing data integrity.

Conversely, if the I/O workload is sufficiently high, it is appreciated that the unmap completion polling operation of the rigorous mode (block 424, FIG. 4) may be appropriate to ensure that the unmapping has been completed before proceeding to the next mapping. Accordingly, if the I/O workload is sufficiently high, the current address mapping management mode may employ the rigorous mode (block 420, FIG. 4) instead of the performance mode, and the unmap completion polling (block 424, FIG. 4) of the rigorous mode may be utilized. As a result, in the rigorous mode, operations do not proceed to the next data write (block 428, FIG. 4) without first waiting for the unmapping to complete (block 424, FIG. 4). Consequently, data integrity may be maintained notwithstanding relatively high levels of I/O workload.

It is appreciated that the level of I/O workload may be monitored and measured using a variety of techniques for purposes of automatically selecting an appropriate address mapping management mode as a function of I/O workload level. In one embodiment, the number of free NVS track buffers may be monitored and an address mapping management mode may be automatically selected as a function of the current number of free NVS track buffers.

For example, in the illustrated embodiment, the system may have eight bays in which each bay houses host adapters 370 and device adapters 340, 350. In one embodiment, the NVS has 300 track buffers for each bay or 2400 track buffers in total. If a particular bay runs out of available track buffers to be mapped to that bay, track buffers normally mapped to another bay may be mapped to that bay.

In one technique for selecting an address mapping management mode, if monitoring determines that the number of available track buffers has fallen below a certain threshold, such as below 50 available track buffers out of a total of 2400 track buffers in this example, the NVS manager may issue a hint to the hypervisor 121 to operate its address mapping management operations as depicted in FIG. 4 in the rigorous mode. Conversely, if monitoring determines that the number of available track buffers has risen above a certain higher threshold, such as above 300 available track buffers out of a total of 2400 track buffers in this example, the NVS manager may issue a hint to the hypervisor 121 to operate its address mapping management operations as depicted in FIG. 4 in the performance mode.

It is appreciated that the number of track buffers utilized by an NVS and the number and magnitude of thresholds utilized to select an address mapping management mode, may vary depending upon the particular application. It is further appreciated that other criteria may be monitored for purposes of selecting an address mapping management mode. For example, the number of dkill operations issued or the duration of time since a particular track buffer was utilized, may be monitored to determine whether an adequate unmapping opportunity has been afforded to ensure that the unmapping of the prior mapping of that track buffer has been completed before that track buffer is reused, and an appropriate address mapping management mode selected. Other criteria may be monitored for purposes of selecting an address mapping management mode, depending upon the particular application.

Figure 7:
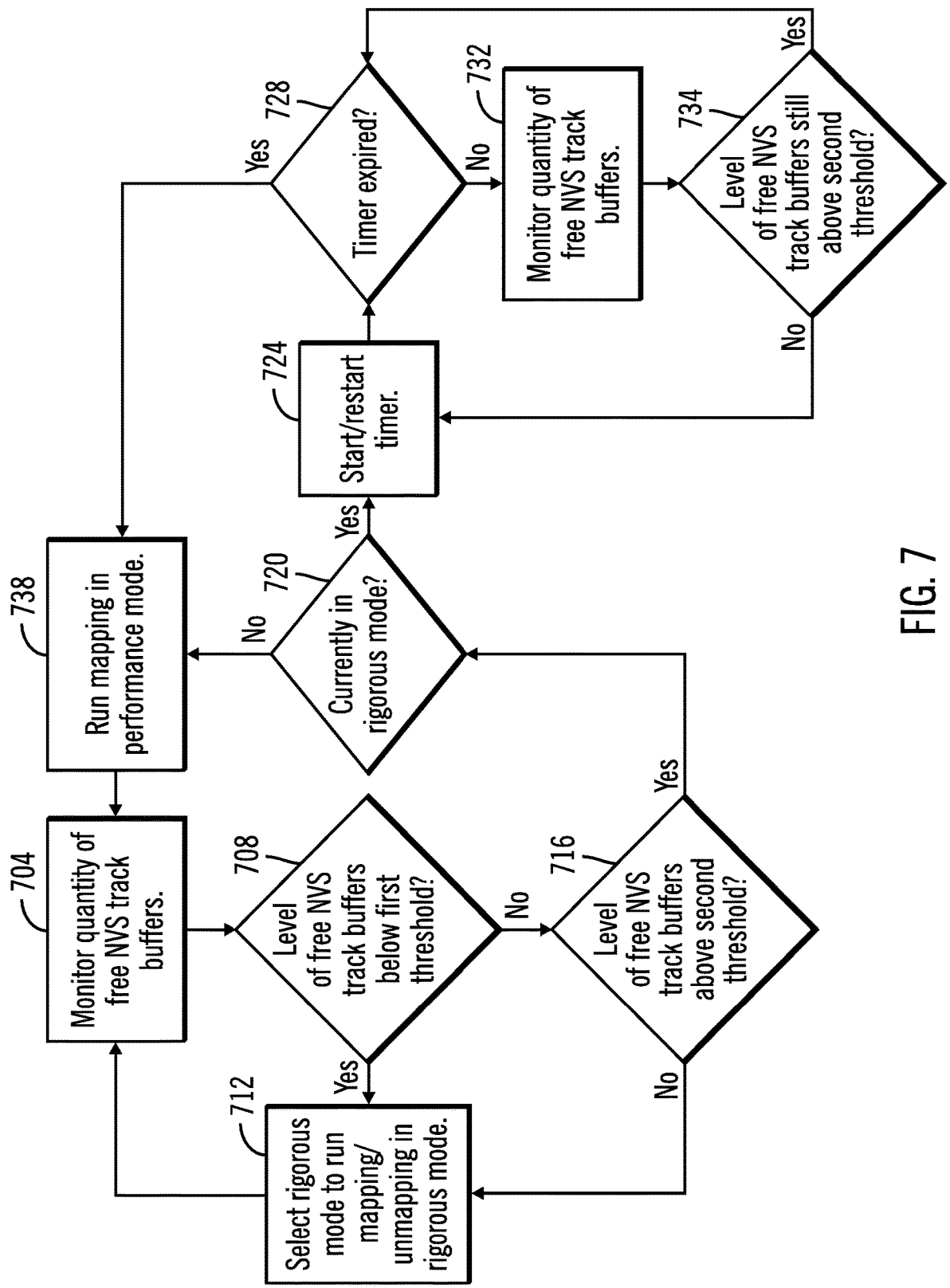
FIG. 7 illustrates, in a flowchart, another example of operations for multi-mode address mapping management in accordance with certain embodiments.

FIG. 7 depicts one example of operations for which of one or more of the cache manager 113 (FIG. 1), NVS manager 119 and physical hypervisor 121 have been configured to automatically select an address mapping management mode as a function of the number of available NVS track buffers. In this example, a wait time is implemented which can reduce the frequency of changing between modes. Although the logic performing the operations of FIG. 7 is described in connection with the cache manager 113 (FIG. 1), NVS manager 119 and/or physical hypervisor 121 in the illustrated embodiment, it is appreciated that logic performing such management operations may be located in fewer devices or in other devices, depending upon the particular application.

More particularly, the quantity of free NVS track buffers is monitored (block 704, FIG. 7) and if the level of free NVS track buffers is determined (block 708, FIG. 7) to fall below a first threshold (such as 50 free NVS track buffers, for example), the rigorous mode may be selected or continued (block 712, FIG. 7). If the selection of the rigorous mode constitutes a switch from the performance mode, in one embodiment, the NVS manager 119 can provide a hint to the hypervisor 121 to switch the mapping/unmapping operations depicted in FIG. 4 to the rigorous mode.

Conversely, if the level of free NVS track buffers is determined (block 708, FIG. 7) to have not fallen below the first threshold (such as 50 free NVS track buffers, for example), in other words, it is determined (block 708, FIG. 7) that the level of free NVS track buffers remains above the first threshold (such as 50 free NVS track buffers, for example), another determination (block 716, FIG. 7) is made to determine if the level of free NVS track buffer remains above a second, higher threshold (such as 300 free NVS track buffers, for example). If not, the rigorous mode is selected or continued (block 712, FIG. 7). Again, if the selection of the rigorous mode constitutes a switch from the performance mode, in one embodiment, the NVS manager 119 can provide a hint to the hypervisor 121 to switch the mapping/unmapping operations depicted in FIG. 4 to the rigorous mode.

Alternatively, if it is determined (block 716, FIG. 7) that the level of free NVS track buffer is currently above the second threshold (such as 300 free NVS track buffers, for example), another determination (block 720, FIG. 7) is made as to whether the mapping/unmapping operation of the hypervisor 121 is currently in the rigorous mode. If not, that is it is determined that the mapping/unmapping operation is currently in the performance mode, the performance mode is continued (block 738, FIG. 7). Conversely, after determining (block 716, FIG. 7) that the level of free NVS track buffer is currently above the second threshold (such as 300 free NVS track buffers, for example), and it is determined (block 720, FIG. 7) that the mapping/unmapping operation of the hypervisor 121 is currently in the rigorous mode, a timer is started/restarted (block 724, FIG. 7) to time a predetermined interval of wait time.

A determination is made (block 728, FIG. 7) as to whether the timer has expired. If so, it is determined that the level of free NVS track buffers has remained above the second threshold for at least the predetermined interval of wait time. Accordingly, the mapping/unmapping operation of the hypervisor 121 is switched (block 738, FIG. 7) from the rigorous mode to the performance mode. In this manner, a wait time is imposed before switching from the rigorous mode to the performance mode to avoid an excessive frequency of mode switching. Here too, the NVS manager 119 can in one embodiment, provide a hint to the hypervisor 121 to switch to the performance mode.

Conversely, if it is determined (block 728, FIG. 7) that the timer has not expired, monitoring of the quantity of free NVS track buffers is continued (block 732, FIG. 7). If at any time during the wait timing interval being timed, it is determined (block 734, FIG. 7) that the level of free NVS track buffers has fallen below the second threshold, the wait timer interval is restarted (block 724, FIG. 7) and the operations of blocks 728-738 are repeated. On the other hand, if is determined (block 734, FIG. 7) that the level of free NVS track buffers has remained above the second threshold for the entire duration (block 728, FIG. 7) of the wait timing interval, in other words, the wait timing interval has expired (block 728, FIG. 7) while the level of free NVS track buffers has remained above (block 734, FIG. 7) the second threshold, the mapping/unmapping operation of the hypervisor 121 is switched (block 738, FIG. 7) from the rigorous mode to the performance mode. Again, the wait time is imposed before switching from the rigorous mode to the performance mode to avoid an excessive frequency of mode switching. Here too, the NVS manager 119 can provide a hint to the hypervisor to switch to the performance mode.

It is appreciated that the such a wait interval is optional and may be provided before switching between other modes. Moreover, it is appreciated that the number of thresholds, and the magnitude of each threshold may vary, depending upon the particular application. Other address mapping management modes may be utilized, depending upon the particular application.

In the illustrated embodiment, the storage manager of the storage controller 102 implementing multi-mode address mapping management in accordance with the present description, is depicted as software stored in a memory and executed by a processor of the storage controller. However, it is appreciated that the multi-mode address mapping management logic functions, may be implemented as hardware, software, firmware or any combination of one or more thereof, depending upon the particular application. In addition, logic functions of multi-mode address mapping management may be implemented in a host or storage in addition to or instead of a storage controller.

In certain embodiments, the memories 112, 114, 116, 118 may comprise a high cost and very low latency device such as a Dynamic Random Access Memory (DRAM) or Static Random Access Memory (SRAM), and less expensive and higher latency and higher capacity storage devices such as non-volatile random access memory (NVRAM), including Magnetoresistive Random Access Memory (MRAM), Phase Change Memory (PCM), Resistive Random Access Memory (RRAM), spin transfer torque memory (STM-RAM), conductive bridging RAM (CBRAM), NAND memory devices, such as flash memory and solid state drives (SSDs), etc. In certain embodiments, the memories 112, 114, 116, 118 may have different endurance profiles with different number of available erase cycles, such that higher levels of the memories 112, 114, 116, 118 allow for a greater number of erase cycles, i.e., greater endurance, than the lower levels of the memories 112, 114, 116, 118.

The storage 101 may comprise one or more storage devices known in the art, such as a solid state storage device (SSD), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The storage devices of the storage 101 may be configured to store data in units or subunits of data storage such as tracks, extents, blocks, pages, segments, cylinders, volumes, etc. Although multi-mode address mapping management in accordance with the present description are described in connection with storage units such as tracks, it is appreciated that multi-mode address mapping management in accordance with the present description is applicable to other storage units and subunits such as sectors, cylinders, volumes, extents, blocks, pages, segments, etc.

The network 111 may comprise a Storage Area Network (SAN), a Local Area Network (LAN), a Wide Area Network (WAN), the Internet, and Intranet, etc. Alternatively, the hosts 108 . . . 110 may connect to the storage controller 102 over a bus interface, such as a Peripheral Component Interconnect (PCI) bus interface and other interfaces known in the art.

Figure 8:
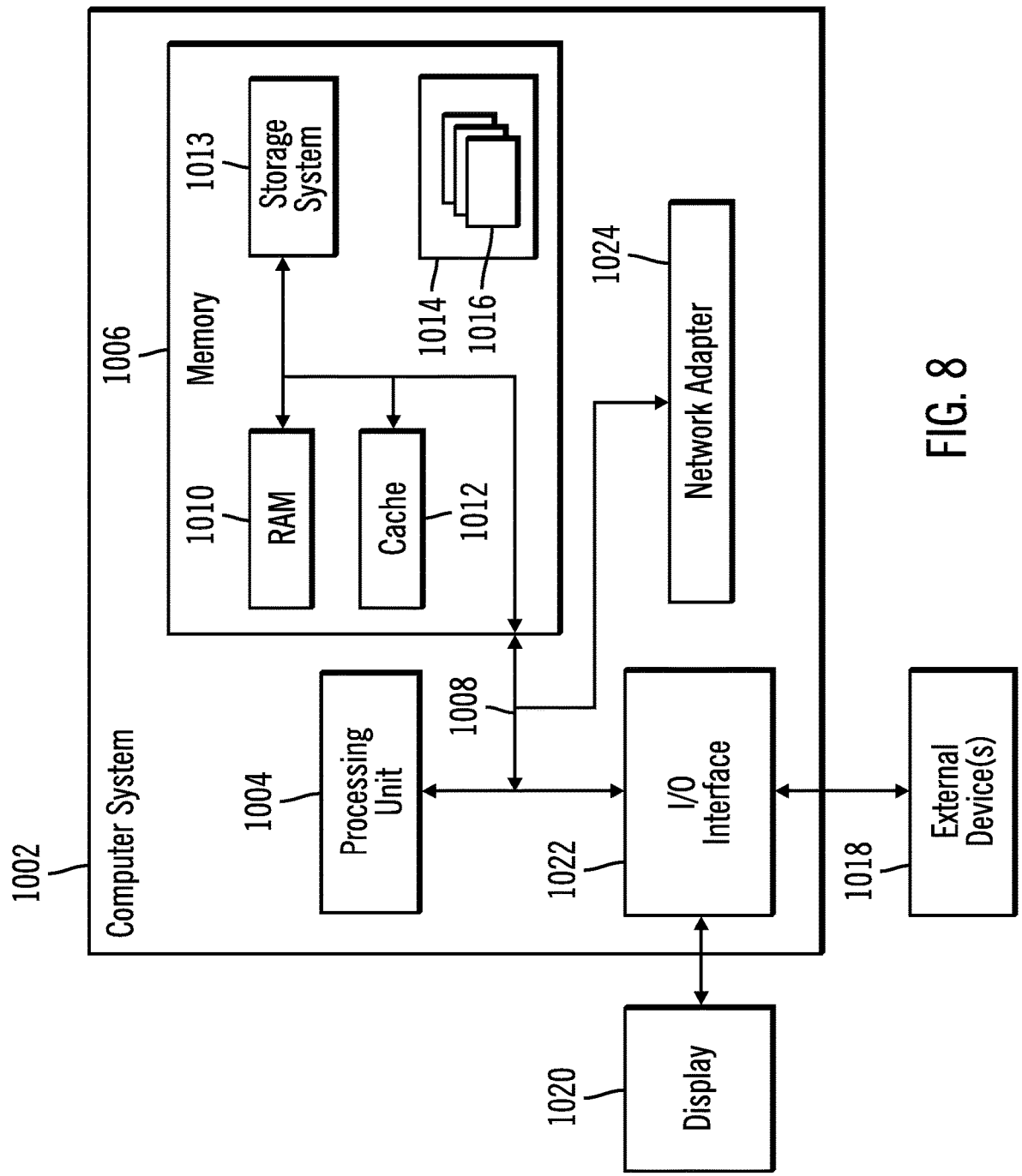
FIG. 8 illustrates, in a block diagram, a computer system employing multi-mode address mapping management in accordance with certain embodiments.

The computational components of the figures may each be implemented in one or more computer systems, such as the computer system 1002 shown in FIG. 8.

The computer system 1002 may be a computer system, which is operational with numerous other general purpose or special purpose computing system environments or configurations. Examples of well-known computing systems, environments, and/or configurations that may be suitable for use with computer system 1002 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product, the computer program product comprising a computer readable storage medium having program code embodied therewith, the program code executable by at least one processor to perform operations, the operations comprising:

address mapping in a selected address mapping management mode, a selected data unit buffer of a storage controller and a selected adapter coupled to the storage controller, for a first data transfer between an address mapped data unit buffer and an address mapped adapter;

upon completion of the first data transfer, initiating unmapping of the address mapped data unit buffer and the address mapped adapter of the first data transfer in the selected address mapping management mode;

in response to the selected address mapping management mode being in a first address mapping management mode, confirming that the initiated unmapping of the address mapped data unit buffer and the address mapped adapter of the first data transfer is complete prior to again initiating address mapping a selected data unit buffer of the storage controller and a selected adapter coupled to the storage controller, for a second data transfer between an addressed mapped data unit buffer and an addressed mapped adapter; and in response to the selected address mapping management mode being in a second address mapping management mode, again initiating address mapping a selected data unit buffer of the storage controller and a selected adapter coupled to the storage controller, for a second data transfer between an address mapped data unit buffer and an address mapped adapter, without confirming that the initiated unmapping of the address mapped data unit buffer and the address mapped adapter of the first data transfer is complete so that confirming that the initiated unmapping of the address mapped data unit buffer and the address mapped adapter of the first data transfer is complete, is bypassed prior to again initiating address mapping a selected data unit buffer of the storage controller and a selected adapter.

2. The computer program product of claim 1, wherein the operations further comprise:

freeing data unit buffers after completion of data transfers to those data unit buffers to be available for an additional data transfer to each free data unit buffer;

monitoring a level of free data unit buffers available for an additional data transfer;

comparing the level of free data unit buffers to a first threshold level; and in response to determining that the level of free data unit buffers is below the first threshold level, selecting the first address mapping management mode.

3. The computer program product of claim 2, wherein the operations further comprise:

monitoring the level of free data unit buffers available for an additional data transfer;

comparing the level of free data unit buffers to a second threshold level; and in response to determining that the level of free data unit buffers is above the second threshold level, selecting the second address mapping management mode.

4. The computer program product of claim 3, wherein the operations further comprise:

in response to determining the level of free data unit buffers to be above the second threshold level, determining a current selected address mapping management mode; and in response to determining that the current selected address mapping management mode is the first address mapping management mode, starting a timer to start timing a first wait period prior to selecting the second address mapping management mode.

5. The computer program product of claim 4, wherein the operations further comprise:

determining during the first wait period whether the level of free data unit buffers remains above the second threshold level;

in response to determining that the level of free data unit buffers remains above the second threshold level during the first wait period, performing said selecting the second address mapping management mode; and in response to determining that the level of free data unit buffers has fallen below the second threshold level during the first wait period, continuing in the first address mapping management mode.

6. The computer program product of claim 5, wherein the operations further comprise:

in response to determining that the level of free data unit buffers has fallen below the second threshold level during the first wait period, restarting the timer to start timing a second wait period;

determining during the second wait period whether the level of free data unit buffers rises above the second threshold level;

in response to determining that the level of free data unit buffers remains above the second threshold level during the second wait period, performing said selecting the second address mapping management mode; and in response to determining that the level of free data unit buffers has fallen below the second threshold level during the second wait period, continuing in the first address mapping management mode.

7. The computer program product of claim 1 wherein an address mapped adapter associated with a particular data transfer is coupled to one of a storage and a host so that the particular data transfer transfers data between the one of the storage and host coupled to the associated address mapped adapter, and an address mapped data unit buffer associated with the particular data transfer.

8. A system, comprising:
a host;
storage; and
a storage controller configured to control the storage, the storage controller having one or more processors, one or more computer-readable memories including a cache and nonvolatile storage (NVS) having a plurality of data unit buffers, one or more computer-readable, tangible storage devices, a plurality of adapters coupling the storage controller to a host and to storage; a hypervisor configured for address mapping between a selected adapter and a selected memory, and program instructions, stored on at least one of the one or more computer-readable, tangible storage devices for execution by at least one of the one or more processors via at least one of the one or more memories, to perform operations, the operations comprising:

address mapping in a selected address mapping management mode, a selected data unit buffer of the storage controller and a selected adapter coupled to the storage controller, for a first data transfer between an address mapped data unit buffer and an address mapped adapter;

upon completion of the first data transfer, initiating unmapping of the address mapped data unit buffer and the address mapped adapter of the first data transfer in the selected address mapping management mode;

in response to the selected address mapping management mode being in a first address mapping management mode, confirming that the initiated unmapping of the address mapped data unit buffer and the address mapped adapter of the first data transfer is complete prior to again initiating address mapping a selected data unit buffer of the storage controller and a selected adapter coupled to the storage controller, for a second data transfer between an addressed mapped data unit buffer and an addressed mapped adapter; and in response to the selected address mapping management mode being in a second address mapping management mode, again initiating address mapping a selected data unit buffer of the storage controller and a selected adapter coupled to the storage controller, for a second data transfer between an address mapped data unit buffer and an addressed mapped adapter, without confirming that the initiated unmapping of the address mapped data unit buffer and the address mapped adapter of the first data transfer is complete so that confirming that the initiated unmapping of the address mapped data unit buffer and the address mapped adapter of the first data transfer is complete, is bypassed prior to again initiating address mapping a selected data unit buffer of the storage controller and a selected adapter.

9. The system of claim 8, wherein the operations further comprise:

freeing data unit buffers after completion of data transfers to those data unit buffers to be available for an additional data transfer to each free data unit buffer;

monitoring a level of free data unit buffers available for an additional data transfer;

comparing the level of free data unit buffers to a first threshold level; and in response to determining that the level of free data unit buffers is below the first threshold level, selecting the first address mapping management mode.

10. The system of claim 9, wherein the operations further comprise:

monitoring the level of free data unit buffers available for an additional data transfer;

comparing the level of free data unit buffers to a second threshold level; and in response to determining that the level of free data unit buffers is above the second threshold level, selecting the second address mapping management mode.

11. The system of claim 10, wherein the operations further comprise:
- in response to determining the level of free data unit buffers to be above the second threshold level, determining a current selected address mapping management mode; and
- in response to determining that the current selected address mapping management mode is the first address mapping management mode, starting a timer to start timing a first wait period prior to selecting the second address mapping management mode.

12. The system of claim 11, wherein the operations further comprise:
- determining during the first wait period whether the level of free data unit buffers remains above the second threshold level;
- in response to determining that the level of free data unit buffers remains above the second threshold level during the first wait period, performing said selecting the second address mapping management mode; and
- in response to determining that the level of free data unit buffers has fallen below the second threshold level during the first wait period, continuing in the first address mapping management mode.

13. The system of claim 12, wherein the operations further comprise:
- in response to determining that the level of free data unit buffers has fallen below the second threshold level during the first wait period, restarting the timer to start timing a second wait period;
- determining during the second wait period whether the level of free data unit buffers rises above the second threshold level;
- in response to determining that the level of free data unit buffers remains above the second threshold level during the second wait period, performing said selecting the second address mapping management mode; and
- in response to determining that the level of free data unit buffers has fallen below the second threshold level during the second wait period, continuing in the first address mapping management mode.

14. A computer-implemented method, comprising:
- address mapping in a selected address mapping management mode, a selected data unit buffer of a storage controller and a selected adapter coupled to the storage controller, for a first data transfer between an address mapped data unit buffer and an addressed mapped adapter;
- upon completion of the first data transfer, initiating unmapping of the address mapped data unit buffer and the address mapped adapter of the first data transfer in the selected address mapping management mode;
- in response to the selected address mapping management mode being in a first address mapping management mode, confirming that the initiated unmapping of the address mapped data unit buffer and the address mapped adapter of the first data transfer is complete prior to again initiating address mapping a selected data unit buffer of the storage controller and a selected adapter coupled to the storage controller, for a second data transfer between an addressed mapped data unit buffer and an addressed mapped adapter; and
- in response to the selected address mapping management mode being in a second address mapping management mode, again initiating address mapping a selected data unit buffer of the storage controller and a selected adapter coupled to the storage controller, for a second data transfer between an address mapped data unit buffer and an addressed mapped adapter, without confirming that the initiated unmapping of the address mapped data unit buffer and the address mapped adapter of the first data transfer is complete so that confirming that the initiated unmapping of the address mapped data unit buffer and the address mapped adapter of the first data transfer is complete, is bypassed prior to again initiating address mapping a selected data unit buffer of the storage controller and a selected adapter.

15. The method of claim 14, further comprising:
- freeing data unit buffers after completion of data transfers to those data unit buffers to be available for an additional data transfer to each free data unit buffer;
- monitoring a level of free data unit buffers available for an additional data transfer;
- comparing the level of free data unit buffers to a first threshold level; and
- in response to determining that the level of free data unit buffers is below the first threshold level, selecting the first address mapping management mode.

16. The method of claim 15, further comprising:
- monitoring the level of free data unit buffers available for an additional data transfer;
- comparing the level of free data unit buffers to a second threshold level; and
- in response to determining that the level of free data unit buffers is above the second threshold level, selecting the second address mapping management mode.

17. The method of claim 16, further comprising:
- in response to determining the level of free data unit buffers to be above the second threshold level, determining a current selected address mapping management mode; and
- in response to determining that the current selected address mapping management mode is the first address mapping management mode, starting a timer to start timing a first wait period prior to selecting the second address mapping management mode.

18. The method of claim 17, further comprising:
- determining during the first wait period whether the level of free data unit buffers remains above the second threshold level;
- in response to determining that the level of free data unit buffers remains above the second threshold level during the first wait period, performing said selecting the second address mapping management mode; and
- in response to determining that the level of free data unit buffers has fallen below the second threshold level during the first wait period, continuing in the first address mapping management mode.

19. The method of claim 18, further comprising:
- in response to determining that the level of free data unit buffers has fallen below the second threshold level during the first wait period, restarting the timer to start timing a second wait period;
- determining during the second wait period whether the level of free data unit buffers rises above the second threshold level;
- in response to determining that the level of free data unit buffers remains above the second threshold level during the second wait period, performing said selecting the second address mapping management mode; and
- in response to determining that the level of free data unit buffers has fallen below the second threshold level during the second wait period, continuing in the first address mapping management mode.

20. The method of claim 14 wherein an address mapped adapter associated with a particular data transfer is coupled to one of a storage and a host so that the particular data transfer transfers data between the one of the storage and host coupled to the associated address mapped adapter, and an address mapped data unit buffer associated with the particular data transfer.

* * * * *